United States Patent [19]
Kutz

[11] Patent Number: 5,749,690
[45] Date of Patent: May 12, 1998

[54] SCREW NUT FASTENER ASSEMBLY

[76] Inventor: Kurt Kutz, 1408 Cherokee Trail, Atlanta, Tex. 75551

[21] Appl. No.: 819,117

[22] Filed: Mar. 17, 1997

[51] Int. Cl.⁶ .......................... F16B 19/00; F16B 33/00; F16B 37/14
[52] U.S. Cl. .......................... 411/431; 411/372; 411/910
[58] Field of Search .................. 411/372, 373, 411/429, 431, 910, 353

[56] References Cited

U.S. PATENT DOCUMENTS

| | | | |
|---|---|---|---|
| 4,302,137 | 11/1981 | Hart | 411/910 X |
| 4,690,167 | 9/1987 | Skipper | 411/910 X |
| 4,784,555 | 11/1988 | Cantrell | 411/431 |

*Primary Examiner*—Neill R. Wilson
*Attorney, Agent, or Firm*—Crutsinger & Booth

[57] ABSTRACT

A non-removable screw nut fastener assembly for affixation to a threaded bolt member comprising a nut member with a round substantially smooth exterior surface having a peripheral snap ring groove, a cap member having one closed end and an interior surface having a peripheral snap ring groove, the cap member being of such size as to fit closely but loosely over the nut member when the nut is fastened to the bolt member substantially enclosing and prevent turning of the nut and a snap ring resting untensioned partly within each of the peripheral grooves to prevent removal of the cap member.

20 Claims, 1 Drawing Sheet

_5,749,690_

1

SCREW NUT FASTENER ASSEMBLY

TECHNICAL FIELD

This invention relates to metal fasteners particularly to screw nut fasteners of easy installation but difficult removal.

BACKGROUND OF INVENTION

In certain applications it is desired to use screw nut fasteners that are easily installed but are very difficult, if not impossible, to remove without destroying the fastener or the bolt or stud to which it is affixed.

As an example, handles for ball valves and other types of valves are often fastened to a flattened valve stem extension by a hexagonal or other type of flat-sided screw nut that can be tightened or loosened with pliers, ordinary open-end adjustable or other types of wrenches. These handles are often lost when vibrations loosens the nut of when, for unknown reasons, vandals or thieves deliberately remove the nuts to take the handles.

The present invention is for the purpose of rendering a screw nut fastener almost impossible to remove after installation, with or without wrenches.

BRIEF DESCRIPTION OF THE INVENTION

The present invention comprises a three-piece assembly. The first piece is a smooth-sided screw nut having a peripheral snap ring slot near its upper end. The second piece is a snap ring fitted into the slot after the nut is installed and tightened. The third piece is a cap like cover member having a smooth round external wall and an internal wall tapered to a peripheral internal snap ring groove positioned to receive the snap ring in the nut groove when the cover is installed fully covering the nut.

Since the outer surface of the nut is smooth, the cap member cannot be wedged against the nut to loosen it by frictional engagement. The cap member is almost impossible to remove from the nut without destroying the fastener assembly. Further, smooth sides of the cap make it extremely difficult to apply any torquing force to the cover even if the cover can somehow be wedged against the nut it covers.

BRIEF DESCRIPTION OF THE DRAWINGS

The above noted features and objects of the present invention will become more apparent from the following detailed description of the invention when read with reference to the accompanying drawings wherein.

DETAILED DESCRIPTION OF THE INVENTION

Figure 1:
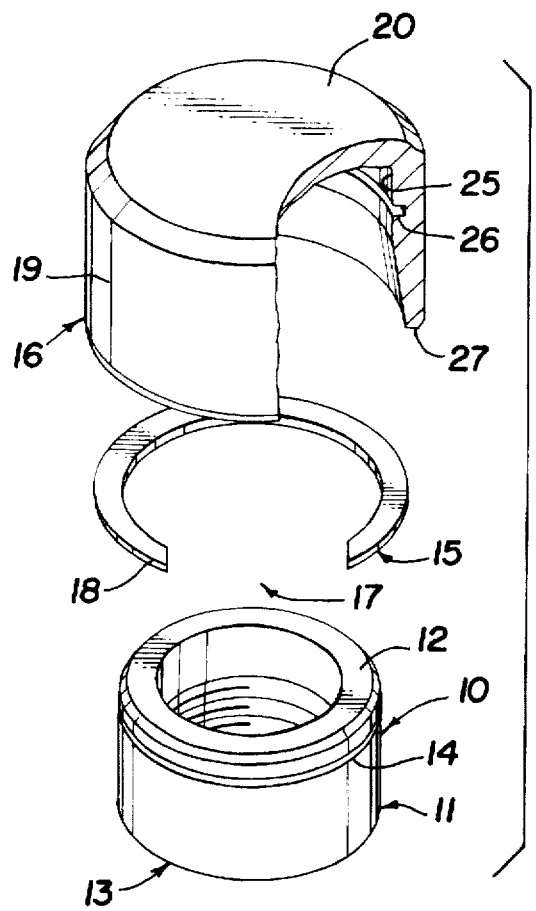
FIG. 1 is an exploded perspective view partly in section of the fastener assembly of the present invention.

Referring now to FIG. 1, there is shown an exploded bottom front perspective view partially in section of the fastener assembly of the present invention. The assembly comprises the nut 10, snap ring 15 and the cap unit 16.

The nut unit 10 has a smooth cylindrical outer wall or surface 11 and flat upper and lower surfaces 12 and 13, respectively. The inner surface 14 of the nut unit 10 is threaded to match a stud or bolt element with which it is to mate. Near the upper surface 12 there is a rectangular peripheral groove 14.

The second unit of the assembly of the present invention is a "snap" ring 15 of suitable material such as spring steel. The snap ring 15 is of rectangular cross-section and of a diameter and vertical thickness to fit closely but loosely into the peripheral groove 14 of the nut unit 10. A gap 17 in the ring 15 allows sufficient expansion of the ring 15 to be pushed into the nut unit 10 and seated in the groove 14. The gap 17 is of a width great enough that the ring 15 may be compressed sufficiently when seated within the groove 14 that the outer surface 18 of ring 15 is flush with the outer wall 11 of the nut unit 10.

Cover or cap unit 16 has a smooth round outer cylindrical surface 19 and a flat upper surface 20. Cap unit 16 has a hollow interior and is open at its lower end. The inner wall 25 of cap unit 16 is of a diameter to fit closely but loosely over the nut unit 10 when installed on a bolt stud or valve stem extension. A peripheral groove 26 is provided around the inner wall 25 of the cap unit 16. Groove 26 is at essentially the same distance from the lower lip 27 of cap unit 16 as is the groove 14 from the lower surface 13 of the nut unit 10. Groove 26 is of sufficient depth and vertical width that snap ring 15 can fit into it closely but loosely when the ring is not tensioned, i.e., neither compressed nor expanded.

The lower portion 28 of inner wall 25 is slanted outwardly from groove 26 to lower lip 27.

For installation the threads of the nut unit 10 or the stud or bolt element to which it is to be connected are coated with an anaerobic thread locking compound and the nut unit 10 screwed down by hand on the stud or bolt. Nut unit 10 can then be tightened by means such as a canvas strap wrench of the well-known type. Thereafter snap ring 15 is pressed down over nut unit 10 until it seats in groove 14. To complete the assembly cap unit 16 is pushed down over the nut unit 10 and ring 15. As the cap unit 16 is pressed down the slanted portion 27 of the inner wall of cap unit 16 compresses snap ring 15 until the cap unit 16 has been pushed far enough down that the snap ring 15 snaps into the groove 26.

Alternatively the groove 26 may be cut to a depth equal to or greater than the cross-section width of snap ring 15 so that in installation the snap ring 15 may be compressed and installed in the groove 26 of cap unit 16 and cap and ring assembly then pushed down over the nut unit 10. As the cap and snap ring assembly is moved down over the nut unit 10 a bevel 23 at the top of nut unit 10 forces snap ring 15 to expand into the groove 26 sufficiently to allow the snap ring to be moved down the upper portion of exterior wall 11 of the nut unit until it seats in groove 14 of the nut unit by spring action.

Figure 2:
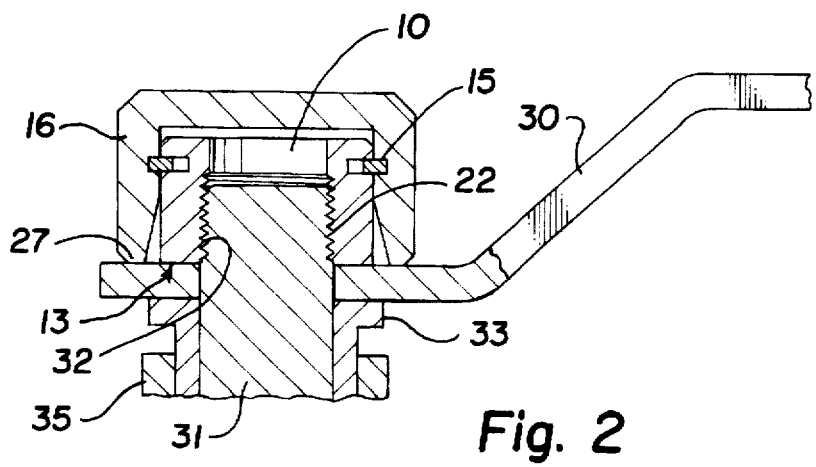
FIG. 2 is a side elevation view in cross-section of the fastener assembly of the present invention installed to hold a valve control handle in place on the valve stem extension.

An installation of this type is illustrated in FIG. 2. FIG. 2 is an elevational view partially in section showing a valve body 35 with a control handle 30 mounted on a bolt element here illustrated as the valve stem extension 31 with threads 32. The threads 22 of nut unit 10 engage the threads 32 of the stem 31. The nut unit 10 has been tightened enough to retain the handle 30 against the stem journal 33 while still allowing rotation of the handle and stem.

Snap ring 15 rests loosely in grooves 14 and 26 holding cap unit 16 so that its lower lip 27 extends essentially to the lower surface 13 of the nut unit 10. The cap unit 16 turns freely about the nut unit 10. Thus, the cap 16 prevents the application of torque either through or under it to the nut 10. Cap 16 once installed cannot be removed without destruction of the assembly.

Nevertheless, it is sometimes desirable to remove and replace the nut 10 such as when repacking of the stem 31 in valve 35 is to be carried out.

Figure 3:
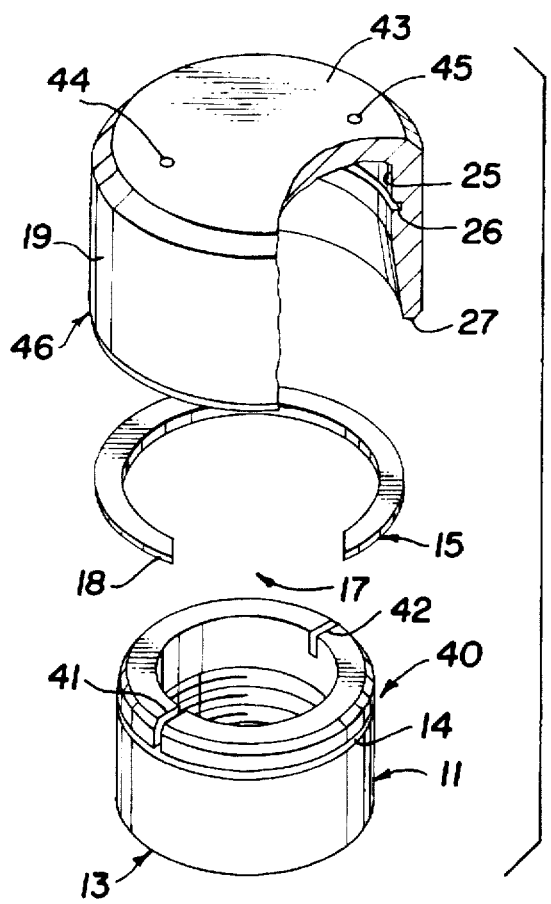
FIG. 3 is a view similar to FIG. 1 illustrating certain optional modifications of the fastener assembly of the present invention.

FIG. 3 illustrates modifications to the nut unit and cap unit to allow their removal without destruction with use of a special tool. As may be seen in FIG. 3, the modified nut unit 40 is of essentially the same construction as nut unit 10.

Modified nut unit 40, however, is provided with a pair of small oppositely extending radial grooves 41 and 42 on its upper surface 43.

Modified cap unit 46 is of the same configuration as cap unit 16 and is provided in addition with a pair of small openings 44 and 45 through its top plate 47. The openings 44 and 45 are on a diameter line on opposite radial distances between the radial distances of the inner and the outer well surfaces of the nut member 10. When it is desired to remove fastener assembly for its mounting stud or bolt a special spanner wrench is used. The pins of the spanner wrench are inserted through holes 44 and 45 in the cap member 46 to contact the nut unit 40. The cap member 46 and wrench are then rotated until the wrench pins may be pushed into grooves 41 and 42. With the wrench pins in grooves 41 and 42 torque can be applied to loosen and remove the nut unit 40 and the entire assembly.

The elements of the fastener assembly of the present invention may be of any metallic alloy or other material suitable for any of the well known types of ordinary or special screw nut fasteners and snap rings.

Thus, there has been described a screw nut fastener assembly providing permanent fastening by a screw nut that is non-removable short of unit destruction. The assembly may be modified to provide for removal by a special spanner wrench.

Although the invention has been described by means of a specific preferred embodiment, many variations and modifications still within the spirit and scope of the invention will be apparent to those skilled in the art and thus the invention is to be limited only as set forth in the following claims.

What is claimed is:

1. A screw nut fastener assembly comprising:
   a nut member, a cap member and a snap ring member;
   said nut member being in the general shape of a thick walled round cylinder section having essentially flat first and second end surfaces, and interior wall surface threaded for mating engagement with a bolt element, and an essentially smooth exterior wall surface, said exterior wall surface having a peripheral groove therein positioned between said end surfaces;
   said cap member being in the general shape of a thick walled round cylinder section having a closed end and an open end and an essentially smooth interior wall surface, said cap member being of a length and internal diameter to accommodate said nut member substantially totally therewithin; said interior wall surface having a peripheral groove positioned at a distance from said open end that it is substantially the same as the distance between the said first end surface and said peripheral groove of said nut member;
   said snap ring member being of a size to rest untensioned partly within said peripheral groove in said nut member and partially within said peripheral groove in said cap member when said cap member is positioned to accommodate said nut member therewithin.

2. The fastener assembly of claim 1 wherein said nut member further includes a beveled surface between said second end surface and said exterior surface thereof.

3. The fastener assembly of claim 1 wherein said cap member further includes a beveled surface between said open end and said interior surface thereof.

4. The fastener assembly of claim 2 wherein said cap member further includes a beveled surface between said open end and said interior surface thereof.

5. The fastener assembly of claim 1 wherein said groove in said cap member is of a size to allow expansion of said snap ring totally into said groove past said interior surface.

6. The fastener assembly of claim 1 wherein the gap in said snap ring is of such size and said groove in said nut member is of a size to allow compression of said snap ring totally into said groove past said exterior surface thereof.

7. The fastener assembly of claim 5 wherein the gap in said snap ring is of such size and said groove in said nut member is of a size to allow compression of said snap ring totally into said groove past said exterior surface thereof.

8. The fastener assembly of claim 4 wherein the gap in said snap ring is of such size and said groove in said nut member is of a size to allow compression of said snap ring totally into said groove past said exterior surface thereof.

9. The fastener assembly of claim 1 wherein said nut member, said cap member and said snap ring are all comprised of metallic materials.

10. A screw nut fastener assembly comprising:
    a nut member, a cap member and a snap ring member;
    said nut member being in the general shape of a thick walled round cylinder section having essentially flat first and second end surfaces, an interior wall surface threaded for mating engagement with a bolt element and essentially smooth exterior wall surface, said exterior wall surface having a peripheral groove therein positioned between said end surfaces, said second end surface having a pair of small oppositely extending radial grooves therein;
    said cap member being in the general shape of a thick walled round cylinder section having a closed end and an open end and an essentially smooth interior wall surface, said cap member being of a length and internal diameter to accommodate said nut member substantially totally therewithin, said interior wall surface having a peripheral groove positioned at a distance from said open end that is substantially the same as the distance between said first end surface and said peripheral groove of said nut member, the closed end of said cap member having a pair of small openings therethrough positioned on a diameter line at opposite radial distances between the radial distances of the inner wall surface and the outer wall surface of said nut member;
    said snap ring member being of a size to rest untensioned partly within said peripheral groove in said nut member and partly within said peripheral groove in said cap member when said cap member is positioned to accommodate said nut member therewithin.

11. The fastener assembly of claim 10 wherein said nut member further includes a beveled surface between said second end surface and said exterior surface thereof.

12. The fastener assembly of claim 10 wherein said cap member further includes a beveled surface between said open end and said interior surface thereof.

13. The fastener assembly of claim 11 wherein said cap member further includes a beveled surface between said open end and said interior surface thereof.

14. The fastener assembly of claim 10 wherein said groove in said cap member is of a size to allow expansion of said snap ring totally into said groove past said interior surface.

15. The fastener assembly of claim 10 wherein the gap in said snap ring is of such size and said groove in said nut member is of a size to allow compression of said snap ring totally into said groove past said exterior surface thereof.

16. The fastener assembly of claim 14 wherein the gap in said snap ring is of such size and said groove in said nut member is of a size to allow compression of said snap ring totally into said groove past said exterior surface thereof.

17. The fastener of claim 13 wherein the gap in said snap ring is of such size and said groove in said nut member is of a size to allow compression of said snap ring totally into said groove past said exterior surface thereof.

18. The fastener assembly of claim 10 wherein said nut member, said cap member and said snap ring are all comprised of metallic materials.

19. A screw nut fastener assembly comprising:

a nut member, a cap member and a snap ring member;

said nut member being in the general shape of a thick walled round cylinder section having essentially flat first and second end surfaces, an interior wall surface threaded for mating engagement with a bolt element and essentially smooth exterior wall surface, said exterior wall surface having a peripheral groove therein positioned between said end surfaces, said second end surface having a pair of small oppositely extending radial grooves therein, said nut member further having a beveled surface between said second end and said exterior wall surface;

said cap member being in the general shape of a thick walled round cylinder section having a closed end and an open end and an essentially smooth interior wall surface, said cap member being of a length and internal diameter to accommodate said nut member substantially totally therewithin, said interior wall surface having a peripheral groove positioned at a distance from said open end that is substantially the same as the distance between said first end surface and said peripheral groove of said nut member, the closed end of said cap member having a pair of small openings therethrough positioned on a diameter line at opposite radial distances between the radial distances of the inner wall surface and the outer wall surface of said nut member, said cap member further having a bevel surface between said open end and said interior surface thereof;

said snap ring member being of a size to rest untensioned partly within said peripheral groove in said nut member and partly within said peripheral groove in said cap member when said cap member is positioned to accommodate said nut member therewithin;

said peripheral grooves in said nut member and said cap member and said snap ring and the gap therein all being of such relative sizes as to allow expansion of said snap ring totally into said peripheral groove and past the interior surface of said cap member and to allow compression of said snap ring totally into said peripheral groove and past the exterior surface of said nut member.

20. The fastener assembly of claim 19 wherein said nut member, said cap member and said snap ring are all comprised of metallic materials.

* * * * *